INVENTOR
Forby W. Lawrence

BY Bailey, Stephens and Huettig
ATTORNEYS

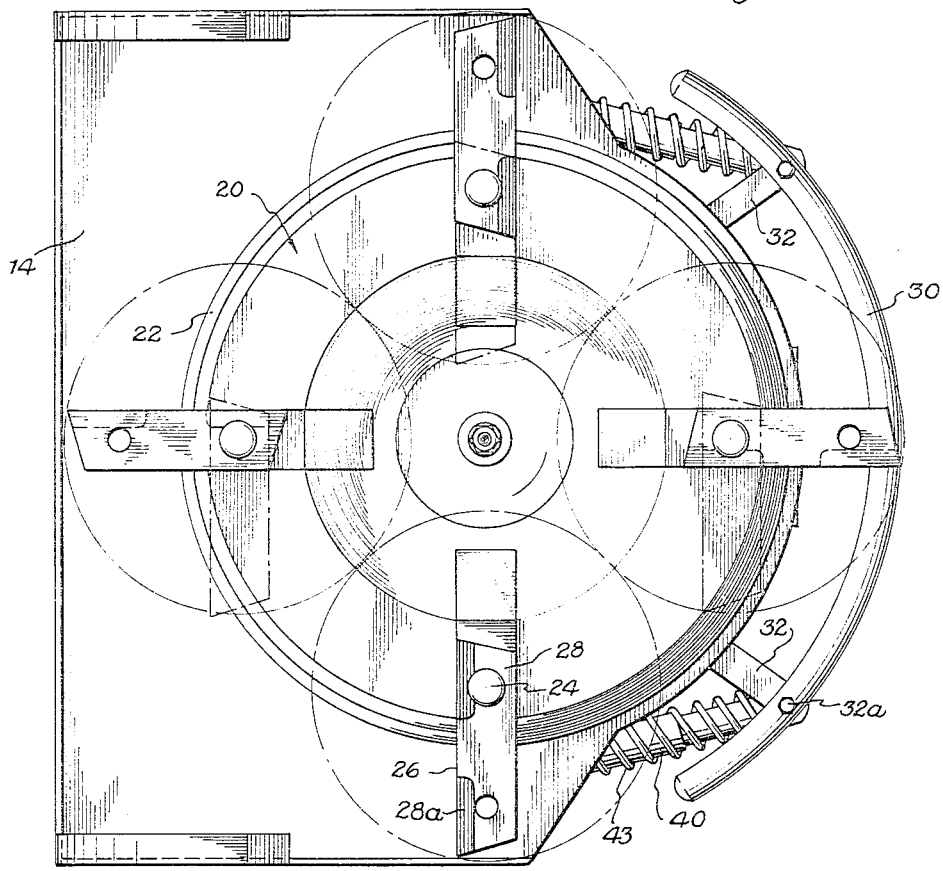
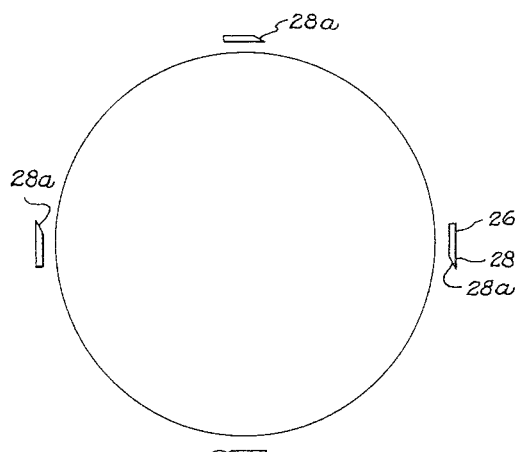

United States Patent Office  3,483,905
Patented Dec. 16, 1969

3,483,905
BRUSH AND TREE CUTTER
Forby W. Lawrence, P.O. Box 954, Selma, Ala. 36701
Filed June 19, 1967, Ser. No. 647,077
Int. Cl. B27g *19/00, 21/00*
U.S. Cl. 144—251                5 Claims

ABSTRACT OF THE DISCLOSURE

In a rotary disc-type mower, the cutter blades are hung below a deck plate so that knife edges can swing outwardly of the leading edge of the deck plate and cut into wood. A spring-pressed protecting bar extends outwardly of said leading edge and over the knife edges. As the mower engages the wood, the bar is pushed back over said plate so that the knife edges can cut into the wood. When the wood has been cut through the bar springs out and pushes the wood out of the path of the mower.

---

This invention relates to a rotary cutter for cutting bushes or small trees.

Rotary cutters, as shown in Lawrence et al. Patents Nos. 2,634,571 and 2,867,963, have a rotating blade holder with knife edges at opposite ends of the holder. The knife edges are pivotally secured to the holder. While this is suitable for cutting grass and weeds, yet it is not effective in cutting through thick brush and small trees. Furthermore, the blade is ordinarily protected by being covered by a deck plate which extends beyond the peripheral path of the blade. This prevents the blade from cutting outwardly of the periphery of the plate and limits the blade to cutting what is beneath the plate.

Horizontal circular saws have been used for cutting trees such as shown by Thomas No. 1,983,582 and Jones No. 2,672,171, but these are not efficient for cutting brush as well as small trees and do not clear a path for the machine.

The object of this invention is to produce a rotary cutter which will cut through the thick brush and small trees, and will push the cut wood away from the path of the cutter.

In general, these objects are obtained by mounting a rotatable disc beneath a deck plate and pivotally securing a plurality of individual knife blades at spaced points around the circumferential portion of the disc. As the disc revolves, the blades swing outwardly of the periphery of the deck plate so that the knife edges of the individual blades will cut into relatively thick wood with a plurality of chopping strokes. As each cutting stroke is being made, the blade will swing inwardly toward the center of the disc as it makes the cut in the wood. After leaving the wood, the blade swings outwardly into the next cutting position. The knife edges of alternate blades are inclined alternately up and down so that alternate chopping strokes are made in the wood. A spring-pressed retractable protecting bar is mounted above the outer peripheral position of the blades. As the blades cut into the wood, this protective bar is pushed inwardly. The bar is curved so that when the wood has been cut through, the bar springs outwardly and pushes the wood to the side and out of the path of the cutter.

Figure 1:
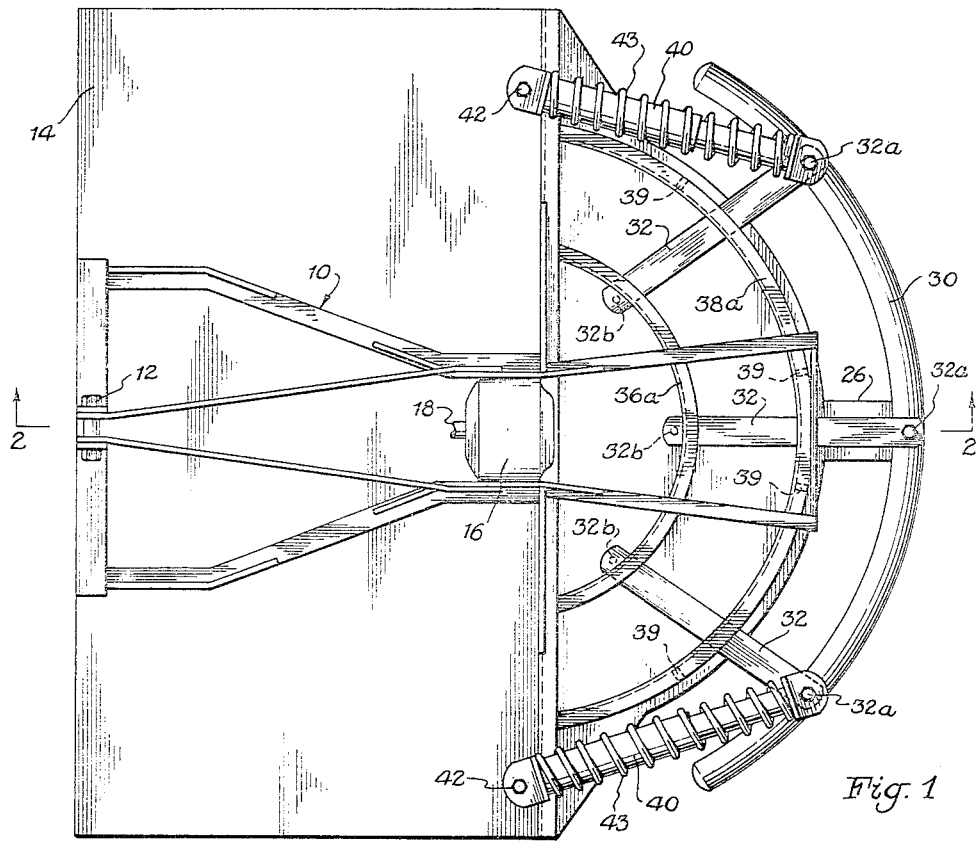
Figure 2:
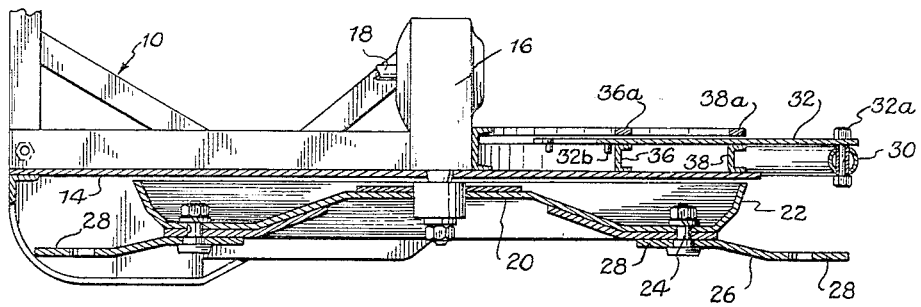

The means by which the objects of the invention are obtained are described more fully with reference to the accompanying drawings in which:

FIGURE 1 is a plan view of the cutter;
FIGURE 2 is a cross-sectional view taken on the line 2—2 of FIGURE 1;
FIGURE 3 is a bottom plan view of FIGURE 1; and
FIGURE 4 is a schematic view showing the alternate inclination of the knife edges of the cutting knives.

The cutter is composed of a frame 10 adapted to be attached by a bracket means 12 to a tractor or the like. This frame holds a deck plate 14. On top of the center of the plate is a gear box 16 into which extends a drive shaft 18. Mounted under plate 14 and driven from the gear box 16 is a rotatable disc 20 which is strengthened by being dished and having a circumferential rim 22. Pivotally attached by bolts 24 to the circumferential portion of the disc 20 are a plurality of knife blades 26.

Each blade is composed of two horizontal outer knife edge portions 28 joined by a slanted center portion. The bolt holes for bolts 24 are in the end portions 28 and are thus displaced from the center of the blade. This makes the blade reversible so that when one knife becomes dull it can be unbolted from one bolt hole and reconnected to the disc 20 through the other bolt hole. As shown in FIGURE 4, the knife edges 28a of alternate blades are oppositely inclined. Thus one blade makes an upcut while the following blade makes a downcut so as to chop chips from the wood.

Mounted on top of plate 14 is the protective bar means. The arcuately curved and tubular protective bar 30 is normally held above the outer ends of knife portions 28 by a plurality of flat iron guide bars 32 pivotally fixed to bar 30 by bolts 32a. Bars 32 are slidable on top of arcuate channel members 36 and 38 which are welded to the top of deck plate 14. Upward movement of the bars is limited by corresponding arcuate strips 36a and 38a, respectively, which are held above the channel members by spacer blocks 39 indicated by dashed lines in FIGURE 1. These blocks limit the sidewise sliding of bars 32. Outward movement of bars 32 is limited by stop pins 32b set in the inner ends of bars 32 and engageable with channel member 36. Furthermore, the bar 30 is held in normal straightaway position by the telescopic struts 40 pivotally secured to bar 30 by bolts 32a and fastened to plate 14 by pivot pins 42. Compression springs 43 urge the bar 30 outwardly when the cutter is not cutting. By means of this arrangement, the bar 30 when pressed against an object, such as a tree, can swing either clockwise or vice versa, and thus, in effect, be retracted so as to clear the knife blade portion 28. The knife can then cut into the wood to a depth from the end of the knife to the outer edge of plate 14.

In operation, the tractor or other vehicle is used to push the protective bar 30 against the wood. Because the bar 30 is spring-pressed and curved, the cutter does not have to be aligned or centered on the wood. As the bar retracts, the knives 26, which extend outwardly of plate 14, chop into the wood. Each blade makes either an up or downcut, while the next blade makes an accordingly down or upcut, thus cutting a slot into the wood. As each blade chops into the wood, it pivots toward the disc 20 and thus is able to leave the part of the cut it has made. After leaving the cut, the blade swings back into outwardly extending cutting position.

At the same time, the bar 30 which has been pushed back and sideways exerts a spring pressure on the wood and when the wood has been cut through, springs out and forces the wood to the side and out of the path of the cutter. At least, when cutting through a tree having a diameter of up to a diameter of about eight inches, the tree trunk is pushed off of its stump and the tree will fall toward the side of the path being cut. Usually the trunk is pushed away from the path of the cutting knives.

The cutter can be adjusted so that the cutting edge portions 28 are at ground level or very close thereto. The disc 20 has the advantage that it can slide over any stumps or tree trunks without being stopped from rotating.

The invention has the further advantage of being able to cut standing grass or weeds as well as being able to cut through thick brush and small trees. At the same time, when the apparatus is used to cut standing grass and weeds, the knives are protected by the bar 30 and the plate 14.

Having now described the means by which the objects of the invention are obtained, I claim:

1. In a rotary cutter having a deck plate, a rotary cutter mounted beneath said plate and having cutting knife edge portions swingable outwardly of the forward edge of said plate, the improvement comprising an arcuately curved protective bar, and compression spring means pivotally mounted on said plate for holding said bar over the outer ends of said knife edges and being pushable toward and sidewise of said plate to expose said knife edges for cutting into wood.

2. In a rotary cutter as in claim 1, said spring means comprising telescopic struts pivotally secured to said protective bar and to said plate.

3. In a rotary cutter as in claim 2, further comprising guide bars pivotally secured to said protective bar and slidably secured to said plate.

4. In a rotary cutter as in claim 3, said knife edge portions being inclined, and with the knife edge portions of said cutter being oppositely inclined for chopping chips out of the wood being cut.

5. In a rotary cutter as in claim 4, said rotary cutter comprising a disc, and said knife edge portions being knife blades pivotally fastened to said disc.

References Cited

UNITED STATES PATENTS 2,589,309   3/1952   Tompkins _____ 143—159
2,638,944   5/1953   Woleslagle _____ 144—251

FRANCIS S. HUSAR, Primary Examiner

U.S. Cl. X.R.

143—159; 144—34